US006292292B1

(12) United States Patent
Garito et al.

(10) Patent No.: US 6,292,292 B1
(45) Date of Patent: *Sep. 18, 2001

(54) RARE EARTH POLYMERS, OPTICAL AMPLIFIERS AND OPTICAL FIBERS

(75) Inventors: Anthony F. Garito, Radnor; Robert A. Norwood, West Chester; Renyuan Gao, Frazer; Anna Panackal, Philadelphia, all of PA (US)

(73) Assignee: Photon-X, Malvern, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/507,582

(22) Filed: Feb. 18, 2000

(51) Int. Cl.[7] ............................. H01S 3/00; C09K 11/08
(52) U.S. Cl. ............................. 359/341; 372/6; 501/45; 252/301.4 P
(58) Field of Search ...................... 252/301.4 P; 501/45; 428/373; 359/341; 372/6

(56) References Cited

U.S. PATENT DOCUMENTS

| Re. 31,057 | 10/1982 | Morris et al. . |
|---|---|---|
| 2,346,155 | 4/1944 | Denison et al. . |
| 3,197,436 | 7/1965 | Block et al. . |
| 3,275,574 | 9/1966 | Saraceno et al. . |
| 3,432,532 | 3/1969 | King . |
| 3,997,853 | 12/1976 | Morris et al. . |
| 4,037,172 | 7/1977 | Filipescu et al. . |
| 4,139,342 | 2/1979 | Sheldrake et al. . |
| 4,225,459 * | 9/1980 | Faulstich et al. ............... 252/301.4 |

(List continued on next page.)

FOREIGN PATENT DOCUMENTS

| 0 556 005 A1 | 8/1993 | (EP) . |
|---|---|---|
| 59-116149 * | 7/1984 | (JP) . |
| 5-238775 * | 9/1993 | (JP) . |
| PCT/EP92/ 02913 | 7/1993 | (WO) . |

OTHER PUBLICATIONS

"Preparation and Fluorescence Properties of Sm–Contining Copolymers", Zhang et al, Department of Materials Science and Engineering, University of Science and Technology of China, Hefe 230026, Oct. 1992, vol. 6, No. 5, pp. 435–438.

"Synthesis and Crywtal Structures of (Pr[(C2H50)2POO] 3)n", Huang et al, Chinese Chemical Letters, vol. 3, No. 11, pp 947–950, 1992.

(List continued on next page.)

Primary Examiner—Mark Hellner
(74) Attorney, Agent, or Firm—Finnegan, Henderson, Farabow, Garrett and Dunner, L.L.P.

(57) ABSTRACT

Disclosed are cost-effective, compact, optically pumped, high gain, rare earth polymer materials such as, erbium ($Er^{3+}$) perfluoro polymers, optical fibers made from the materials and waveguide amplifiers made from the materials having low-loss at telecommunications wavelengths for operation in communications network systems. The polymer amplifier is based on the use of novel high performance rare earth (RE) polymer materials. The new discovered highly transparent RE polymer materials are directly synthesized at high RE ion concentrations ($\sim 10^{20}-10^{21}$ rare earth ion/$cm^3 \sim 10\%$ wt) with each metal ion encapsulated and physically buffered by insulating, covalently bonded, perfluorinated phosphate ligands that then form the high temperature stable, polymer backbone matrix. This is distinctly different from widely studied inorganic glasses and single crystals where RE ion salts are doped directly into the host but only to relatively low levels (<0.1% wt).

11 Claims, 5 Drawing Sheets

Erbium ion

High temperature linkage

One dimensional axis

U.S. PATENT DOCUMENTS

| | | |
|---|---|---|
| 4,272,733 | 6/1981 | Walling et al. . |
| 4,780,877 | 10/1988 | Snitzer . |
| 4,811,349 | 3/1989 | Payne et al. . |
| 4,860,295 | 8/1989 | Byer et al. . |
| 4,962,995 * | 10/1990 | Andrews et al. ................. 350/96.34 |
| 5,005,175 | 4/1991 | Desurvire et al. . |
| 5,032,315 | 7/1991 | Hayden et al. . |
| 5,093,147 | 3/1992 | Andrus et al. . |
| 5,105,434 | 4/1992 | Krupke et al. . |
| 5,140,658 | 8/1992 | Sunshine . |
| 5,282,260 | 1/1994 | Buchal et al. . |
| 5,287,217 | 2/1994 | Cockroft . |
| 5,301,054 | 4/1994 | Huber et al. . |
| 5,338,607 * | 8/1994 | Kawamoto et al. ................. 428/373 |
| 5,364,819 * | 11/1994 | Dexter et al. .......................... 501/45 |
| 5,379,149 | 1/1995 | Snitzer et al. . |
| 5,524,016 | 6/1996 | Pappalardo et al. . |
| 5,555,342 | 9/1996 | Buchal et al. . |
| 5,694,500 | 12/1997 | Page et al. . |
| 5,726,796 | 3/1998 | Regener et al. . |
| 5,755,998 * | 5/1998 | Yamazaki et al. ............. 252/301.4 P |

OTHER PUBLICATIONS

A Proposal for Positive Cooperativity in Anion–Cation Binding in Yttrium and Lutetium Complexes Based on o–Amino–Substituted Phenolate Ligands On the Way to Coordination Polymers by Self–Assembly. Molecular Structures of [ClLu(OAr)3)Na] (X–ray) and [ClY(OAr')3Y(OAr')3NA] (X–ray and 89Y–NMR); Hogerheide et al; Inorganic Chemistry, vol. 35, No. 5, 1996, 35, 1185–1194.

Inorganic Coordination Polymer Chromium (III) Tris0phosphinates), Nannelli et al, Technological Center, Pennwalt Corporation, John Wiley & Sons, Inc., 1973, 2691–2701.

"Luminescence and IR Spectroscopy of Europium(III) Complexes with New Organophosphorus Ligands", Bel'tyukova et al, A.V. Bogat–skii Physical Chemistry Institutte, Academy of Sciences of the Ukrainian SSr, Institute of Radio Engineering and Electronics, Academy of Sciences o the USSR. Translated from Koordinatsionnaya Khimiya, vol. 15, No. 6, pp. 848–852, Jun., 1989. Original article submitted Jun. 16, 1987.

"Synthesis, Characterization and Fluorescence Properties of #Europium(3+) and terbium (3+} Bipyridyl Complex Containing Ion Polymers", Zhu et al, Polymer Research Institute, Polytechnic Institute of New York, pp. 78–83.

"Synthesis and Optical Properties of New Inorganic Phosphate Matrices", Lou et al., Journal of Sol–Gel Science and Technology, 2, 787–789 (1994).

"Crystal Structure of Tris(dimethoxyphosphato) Lanthanum (III) Coordination Polymer {La[PO2(OCH3)2}3}n" Fu et al, Chinese J. Struct. Chem., vol. 13, No. 1, pp. 24–27.

"Synthesis and Properties of Dimethylsulfoxide Complexes", Zinner et al, An. Acad. brasil. Cilnc, (1986) 58(2), pp. 183–187.

"Synthesis, Characterization and Applications of Rare Earth Metal ion Chelating Polymers", Okamoto et al, Polytechnic Institute of New York, Department of Chemistry annd Polymer Research Institute; pp. 425–450.

"Rare–Earth–Metal–Containing Polymers. 5. Synthesis, Characterization, and Fluroescence Properties of Eu3+Polymer Complexes Containing Carboxylbenzoyl and Carboxylnaphthoyl Ligands", Ueba et al, Journal of Polymer Science: Polymer Chemistry Edition, vol. 20, 1271–1278 (1982).

"Rare Earth Metal Containing Polymers. 4. Energy Transfer from Uranyl to Europium Ions in Ionomers", Okamoto et al, Macromolecules, 1981, 14, 807–809.

"Rare Earth Metal Containing Polymers. 3. Characterization of Ion–Containing Polymer Structures Using Rare Earth Metal Fluorescence Probes 1a", Okamoto et al, Macromolecules 1981, 14, 17–22.

"Investigation on the Synthesis and Characterization of Rare Earth Metal–Containing Polymers. II. Fluorescence Properties of Eu3+–Polymer Complexes Containing Beta–Diketone Ligand", Ueba et al; Journal of Applied Polymer Science, vol. 25, 2007–2017 (1980).

"Synthesis and Characterization of Rare Earth Metal–Containing Polymers. I. Fluorescent Properties of Ionomers Containing Dy3+, Er3+, Eu3+, and Sm3+", Banks et al, Journal of Applied Polymer Science, vol. 25, 359–368 (1980).

Solid Polymers Doped with Rare Earth Metal Compounds, III. Formation and Stability of Macromolecular Complexes Comprising Neodymium Nitrate and Dipivaloylmethane in Poly(Ethynene Oxide), Twomey et al, Journal of Polymer Science: Part B: Polymer Physics, vol. 32, 551–560 (1984).

"Inorganic Coordination Polymers. XVIII. Observations on Brittle and Flexible Films of [Cr[OP(CH3)(C6H5)O]2 [OP(C8H17)20]}x *" Nannelli et al, Journal of Polymer Science: Polymer Chemistry Edition, vol. 13, 2849–2856 (1975).

"Polymeric Metal Phosphinates", Inorganic Macromolecules Review, 1 (1970)115–125.

"Solid Polymers Doped with Rare EArth Metal Salts. I. Complex formation and Morphology in the Neodymium Chloride–Poly (Ethylene Oxide) System", Twomey et al, Journal of Polymer Science: part B: Polymer Physics, vol., 29, 859–865 (1991).

"Solid Polymers Doped with Rare Earth Metal Salts. II. Thermal Behavior and Morphology of the Neodymiumm Acetate–Poly(Ethylene Oxide) System", Twomey et al, Journal of Polymer Science: Part B: Polymer Physics, vol. 31, 647–654 (1993).

"A study of neodymium–chelate–doped optical polymer waveguides", Lin et al, J. Appl. Phys. 79(6), Mar. 15, 1996, pp. 2868–2874.

"Properties of Some Europium Laser Chelates Derived from Benzoyltrifluoroacetone", Charles et al, J. Inorg. nucl. Chem., 1966, vol. 28, pp 3005 to 3018.

"Spectroscopy of Dy3+ in Ge–Ga–S glass and its suitability for 1.3–um fiber–optical amplifier applications", Wei et al, Optics Letters/vol. 19, No. 12/Jun. 15, 1994, pp. 904–905.

"Effects of chromophore dissociation on the optical properties of rare–earth–doped polymers", Gao et al, Applied Optics/vol. 37, No. 30/Oct. 20, 1998, pp. 7100–7106.

"Systems Evaluation of an ER3+–Doped Planar Waveguide Amplifier", Nykolak et al, IEEE Technology Letters, vol. 5, No. 10, Oct. 1993, pp. 1185–1187.

"Erbium–Doped Glasses for Fiber Amplifiers at 1500 nm", William J. Miniscalco, Journal of Lightwave Technology, vol. 9 No. 2, Feb. 1991, pp. 234–250.

"Effects of Concentration on the Performance of Erbium–Doped Fiber Amplifiers", Myslinski et al, Journal of Lightwave Technology, vol. 15, No. 1, Jan. 1997, pp. 112–120.

"Performance of High Concentration ERbium–Doped Fiber Amplifiers", Myslinski et al, IEEE Photonics Technology Letters, vol. 11, No. 8, Aug. 1999, pp. 973–975.

"All light now fibre amplifiers and their impact on telecoms", IEE Review, Jan. 1991, pp. 35–39.

"Fibre amplifier comes ashore", Dettmer, IEE Review May 1994.

"The Golden Age of OpticalFiber Amplifiers", Desurvire, Physics Today, Jan. 1994, pp. 20–27.

* cited by examiner

RARE EARTH POLYMERS, OPTICAL AMPLIFIERS AND OPTICAL FIBERS

STATEMENT REGARDING FEDERALLY SPONSORED RESEARCH OR DEVELOPMENT

The U.S. Government has rights in the invention under U.S. Navy Contract Nos. N00014-00-M-0029 and N00014-00-C-0117.

BACKGROUND OF THE INVENTION

1. Field of the Invention

The invention relates to rare earth polymer compositions, optical fibers, optical waveguides, and particularly to optical amplifier waveguides and splitters.

2. Description of the Related Art

Optical communication systems based on glass optical fibers (GOFs) allow communication signals to be transmitted not only over long distances with low attenuation but also at extremely high data rates, or bandwidth capacity. This capability arises from the propagation of a single optical signal mode in the low-loss windows of glass located at the near-infrared wavelengths of 0.85, 1.3, and 1.55 $\mu$m. Since the introduction of erbium-doped fiber amplifier (EDFA), the last decade has witnessed the emergence of single-mode GOF as the standard data transmission medium for wide area networks (WANs), especially in terrestrial and transoceanic communication backbones. In addition, the bandwidth performance of single-mode GOF has been vastly enhanced by the development of dense wavelength division multiplexing (DWDM), which can couple up to 160 channels of different wavelengths of light into a single fiber, with each channel carrying gigabits of data per second. Moreover, in a recent demonstration, a signal transmission of 1 terabit ($10^{12}$ bits) per second was achieved over a single fiber on a 100-channel DWDM system. Enabled by these and other technologies, the bandwidth capacities of the communication networks are increasing at rates of as much as an order of magnitude per year.

The success of single-mode GOF in long-haul communication backbones has given rise to the new technology of optical networking. The universal objective is to integrate voice video, and data streams over all-optical systems as communication signals make their way from WANs down to smaller local area networks (LANs), down to the curb (FTTC), home (FTTH), and finally to the end user by fiber to the desktop (FTTD). Examples are the recent explosion of the Internet and use of the World Wide Web, which are demanding vastly higher bandwidth performance in short- and medium-distance applications. Yet as the optical network nears the end user starting at the LAN stage, the system is characterized by numerous fiber connections, splices, and couplings, especially those associated with splitting of the input signal into numerous channels. All of these introduce enormous optical loss. To compensate for the unacceptably high loss penalty, current solutions rely on expensive EDFAs that are bulky at fiber lengths of about 40 m. The cost of a typical commercial EDFA can reach many tens of thousands of dollars. Thus, to complete the planned build-out for FTTC, FTTH, and FTTD in the US would require millions of amplifiers and hundreds of billions of dollars.

An EDFA module is made up of a number of key components. One of the most critical components in the module is the erbium doped silica fiber (EDF). Present EDF is limited by low concentrations of erbium atoms, clustering that leads to quenching of photoluminescence, a relatively narrow emission band, a highly wavelength dependent gain spectrum, and an inability to be fabricated in a compact, planar geometry. Efforts have been directed toward the use of other rare earth ions in both fused silica glass hosts and other glasses including fluoride, tellurite and phosphate glasses. To this point, these efforts have been limited by the fundamental materials properties of these glass media with regard to their ability to dissolve rare earth atoms, mechanical properties, thermal stability, and other key properties.

The benefits of the present invention are based on the development of rare earth fluorphosphinate polymer material that have the following preferred properties:

- compatibility with a broad range of rare earths that enable coverage of the full 1500 to 1600 nm window (and beyond) using a common host platform;
- very high concentrations of rare earth elements without associated quenching and upconversion penalties, allowing for very short lengths of fiber to be used as small as centimeters and less;
- very low intrinsic optical loss;
- capable of being drawn into single mode optical fiber; and
- capable of being cast into films for planar waveguide applications.

Cost effective, compact integrated optics is a preferred solution to this problem, but currently none exists.

It is an object of the present invention to provide novel optical waveguide materials that are easy to process using standard silicon VLSI (very large scale integration) fabrication methods and optical fiber drawing processes.

It is a further objective of the present invention to produce a fiber amplifier and material therefor having low-loss in short and medium distance communications network systems.

It is an object of the present invention to produce an integrated optical component that is a low-loss splitter that combines amplification and splitting of the input light signal while maintaining a high signal-to-noise ratio.

SUMMARY OF THE INVENTION

Disclosed are cost-effective, compact, optically pumped, high gain, rare earth polymer materials such as, erbium ($Er^{3+}$) fluorophosphinate polymers, optical fibers made from the materials and optical amplifiers made from the materials having low-loss at telecommunications wavelengths for operation in data communications network systems. The polymer amplifier is based on the use of novel high performance rare earth (RE) polymer materials. The highly transparent RE polymer materials are directly synthesized at high RE ion concentrations ($\sim 10^{20}$–$10^{21}$ rare earth ion/$cm^3$ $\sim 10\%$ wt) with each metal ion encapsulated and physically buffered by insulating, covalently bonded, perfluorinated phosphate ligands that then form the high temperature stable, polymer backbone matrix. This is distinctly different from widely studied inorganic glasses and single crystals where RE ion salts are doped directly into the host but only to relatively low levels (<0.1% wt).

The RE polymer material as depicted in FIG. 1 is designed for use in an integrated optical circuit element utilizing numerical modeling and computer simulations. Utilizing this RE polymer material, the polymer amplifier length can be as short as several cm because of the ultra high gain coefficient of >5 dB/cm. As a complement to the cost effective VLSI methods utilized for the planar waveguide architecture, standard low-cost fiber drawing methods are used to fabricate the fiber amplifier element to further realize significant cost reduction of the final integrated optical device.

The use of RE polymer materials affords the devices several unique properties and advantages. These include high RE ion concentrations with homogeneous distribution, enhanced optical transition moments, controllable decay rates and branching ratios, novel energy transfer effects, and relatively low optical loss across the near infrared region. The combination of these critical features is not available in standard RE-doped silica glasses and inorganic crystals.

RE polymer systems have many outstanding materials properties. These include simple two-step synthesis by standard organic methods; ease of synthesis modification; ease in fiber and planar waveguide fabrication by standard methods; compatibility with various cladding materials; high thermal, mechanical, and photostabilities; and room temperature operation. Further, the new RE polymers easily form highly transparent thin films both by simple casting and standard spin coating methods. For compact optical amplification devices, the processing properties of silica glass and inorganic crystal systems are inferior to the RE polymer materials.

The successful realization of RE-containing polymers is not straightforward, and the reasons for this are fundamental and intrinsic. Common organic polymers contain high-frequency optical phonons, such as O—H stretch (~3600 cm$^{-1}$) and C—H stretch (~3200 cm$^{-1}$) vibrations. These vibrations play the dominant role in phonon-assisted, non-radiative removal of electronic excitation energy from optically excited RE ions. Such nonradiative decay of RE metastable states markedly reduces the radiative efficiency of the RE containing material and, consequently, severely degrades amplifier device performance. This is especially strong in the case of $Er^{3+}$ because of the relatively small energy gap between the ground and metastable electronic states. Moreover, high order overtones of the same O—H and C—H vibrations are also the origin of unacceptably high optical absorption loss across the entire near infrared region observed in standard polymer optical fibers and waveguides. Thus, the same solution of the phonon-assisted, nonradiative decay problem naturally holds for the unwanted absorption loss in optical polymers.

To achieve the ultra high gain polymer optical fiber amplifiers and provide solutions to these basic problems, we employ the novel RE fluorophosphinate polymers as the active waveguide core material. In these materials, all of the usual high frequency O—H and C—H bonds are replaced by C—F bonds having considerably reduced frequency vibrations (~1000–1200 cm$^{-1}$). Disclosed are several general classes of high optical transparency RE perfluoro polymers for optical amplification applications. The RE ion concentration in these polymers is relatively high on the order of $10^{20}$–$10^{21}$ RE ions/cm$^3$. At the same time, we have identified a variety of other fluoropolymers for use as cladding materials with our new RE perfluoro polymers. In addition to $Er^{3+}$, all of the RE metal ions can be encapsulated in this manner at high concentrations.

DESCRIPTION OF THE PREFERRED EMBODIMENTS

The preferred material for the rare earth polymer composition is one of the general formula

where X is a rare earth element. Suitable rare earth elements include erbium, europium, samarium, dysprosium, neodymium, praseodymium, thulium and ytterbium. Mixtures of these materials are also contemplated. All other rare earth ions are also within the contemplation of the invention. R is preferably a fully halogenated organic group, and R' is another fully halogenated organic group, the same or different from R.

R and R' can be fluoroalkyl chains of the general composition $C_mF_{2m+1}$, where $m \geq 1$, and R=R' or R≠R'. Another particular group is a hexafluorophenoxy group of the composition $C_6F_5O$.

The composition of the polymer can also include commercially available fluoropolymers, including fluorinated polyimides, polytetrafluoroethylene, fluoroacrylates, fluorosilicones and branded fluoropolymers such as CYTOP® (Asashi Glass) and THV® (3M).

The compositions identified above are used to produce cores for optical fibers. The cores can be cladded with suitable materials having a lower refractive index than the core. The core/cladding refractive index difference is small enough to result in single optical mode preparation for optical wavelengths from 1200–1700 nm.

Further, the compositions identified can be used to produce an optical amplifying film, containing a substrate, a buffer film, a guiding layer, and an upper cladding film, such that the refractive indices of the buffer film and the upper cladding film, are less than that of the guiding layer film, with the resulting waveguide guiding a single optical mode for optical wavelengths from 1200–1700 nm.

Figure 2:
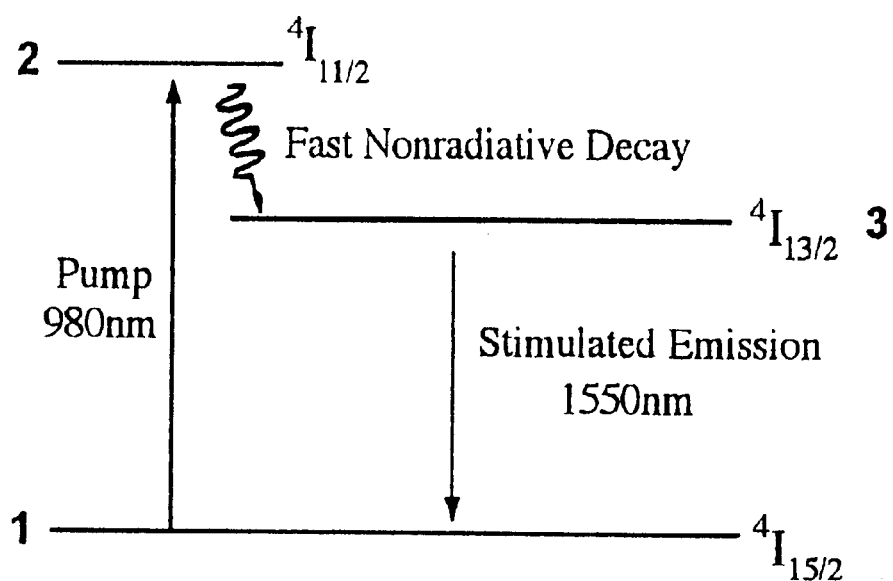
FIG. 2 is an energy level diagram of erbium chromophore 3-level model.

RE waveguide amplifiers operate on the basic 3-level and 4-level laser transition principles. The single pass gain of the waveguide amplifier is the fundamental parameter to be calculated. Amplification in a RE polymer waveguide, as with most types of laser systems, can be described with a 3-level model. FIG. 2 displays the energy level diagram of such a model for $Er^{3+}$ ion.

In an amplifier, the RE ions start out in their ground state, level 1. The electrons are then excited to level 2 by a pump beam of photons with energy $\hbar\omega_p$ equal to the transition energy from 1→2. The ions subsequently undergo fast nonradiative decay to level 3, which is the metastable state of the system. The lifetime of this state is very long in comparison to the nonradiative decay. As a consequence, a population inversion is created in level 3. Then, as a signal beam passes by the ions, it stimulates emission of photons with the same signal energy, $\hbar\omega_s$. This stimulated decay is from level 3 to level 1, the ground state.

One of the most pronounced advantages of encapsulating the RE ion as a chromophore is the ability to control the manifold of electronic excited states. Provided is an optical energy transfer mechanism between the surrounding organic ligands of the chromophore unit and the central RE ion in which the RE excited state can be populated through selective absorption ("light harvesting") by the chromophore ligand and subsequent energy transfer to the RE site. This transfer can approach unit efficiency, and, as a result, can increase the absorption cross-section by a remarkable $10^4$–$10^5$ times that of bare RE ions.

Figure 3:
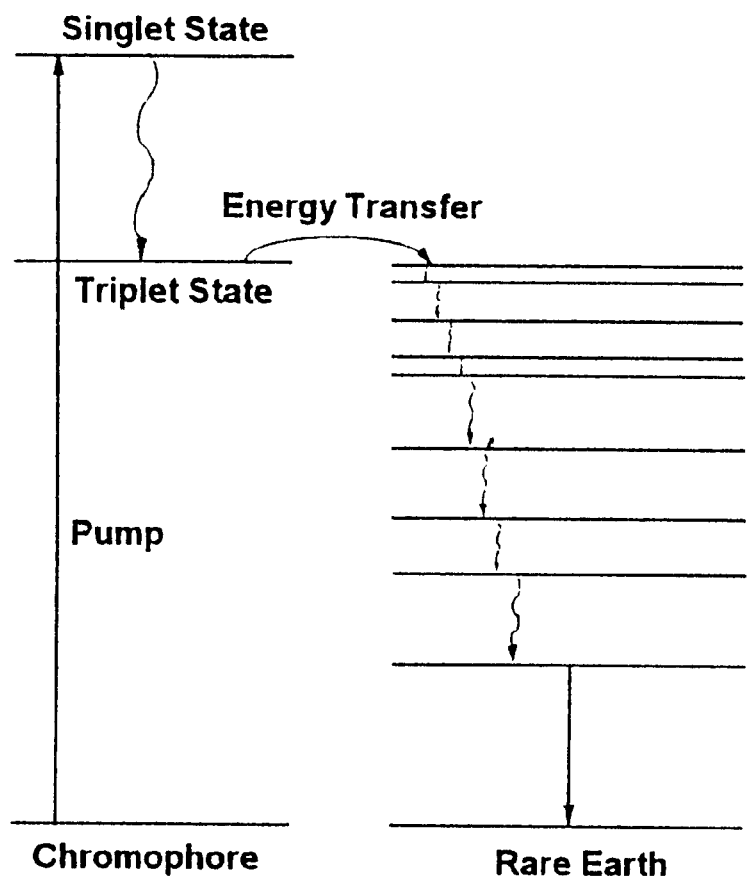
FIG. 3 is a depiction of the optical energy transfer mechanism in RE perfluoro polymers.

The process is diagramed in FIG. 3, showing how the chromophore ligand singlet band is first excited by pump light and then decays nonradiatively through inter-system crossing (IC) to its bottleneck triplet state. Radiative transitions back to the ground state are spin forbidden and, hence, the chromophore ligand can relax through energy transfer to the encapsulated RE ion. This energy transfer is maximized by tuning the energy gap, again through chromophore design, between the ligand triplet state and the upper level of RE fluorescing transition.

The optical attenuation coefficient of an optical waveguide determines the output intensity of the transmitted signal. The various factors contributing to optical loss in optical polymers can be divided into intrinsic and extrinsic loss. Intrinsic loss includes vibrational absorption of the polymer materials, electronic transition absorption, and Rayleigh scattering. Extrinsic loss includes absorption due to impurities, scattering from dust and microvoids, and imperfections in fiber parameters. Extrinsic loss is related to materials processing and fiber fabrication, and thus can be reduced by perfecting each procedure. Intrinsic loss is material related and cannot be reduced without drastic changes in material composition.

Standard optical polymer materials are based on hydrocarbon (C—H) structures. A prototypical example is polymethylmethacrylate (PMMA) which has three principal loss windows located at 570, 650, and 780 nm between absorption maxima arising from C—H vibrational overtone modes. In high optical quality samples, the principal window at 650 nm exhibits a measured minimum loss of 110 dB/km, very close to the theoretical limit of 106 dB/km. Molecular vibrations of aliphatic hydrocarbons in PMMA are the dominant intrinsic loss factor in optical polymer waveguides. The fundamental CH vibration occurs at 3.2 $\mu$m. The attenuation loss in the visible wavelength region is affected mainly by the 5th to 7th high harmonics of CH absorption. At the 650 nm window, CH absorption contributes about 90 dB/km to the total loss. In the near-infrared region, the minimum loss exceeds $10^4$–$10^5$ dB/km, thereby excluding standard optical polymers and RE chromophore structures based on them for use at the three telecommunications wavelengths of 850, 1300, and 1550 nm.

The intensities of the harmonic absorption bands decrease by one order of magnitude with each successive harmonic. If hydrogen is replaced with a more massive atom, the wavelengths of the fundamental vibration and subsequent harmonics would be shifted to longer wavelength regions. The order of higher harmonics which affects the near-infrared region would be higher, resulting in significant decreases in vibrational absorption.

Indeed, when the short wavelength O—H and C—H bonds are replaced by C—F bonds having a markedly longer fundamental stretch vibration at 10 $\mu$m, the resulting fluoropolymer waveguide exhibits a reduced loss of 10 dB/km with a practically flat dispersion over the near-infrared range. The primary contributing factors to the fluoropolymer loss are wavelength-independent structural waveguide imperfections and Rayleigh scattering, $$\alpha_R = 9.5 \left(\frac{568}{\lambda}\right)^4 \text{dB/km},$$

as based on measurements of fluorinated polymer waveguides. Losses attributed to electronic absorption are negligible as are absorptions from molecular vibrations. The C—F vibrational overtones are basically nonexistent in the visible region and have strengths in the near infrared range of much less than 1 dB/km even up to near 1500 nm. Consequently, the total theoretical loss of a perfluorinated polymer waveguide approaches 10 dB/km well into the near-infrared and is less than 25 dB/km over most of the visible spectrum.

Varieties of fluoropolymers for passive optical waveguides have been developed for direct use, including, for example, ether-, perfluoromethyl-, and chloro-substituted (polytetrafluoroethylenes); acrylates; silicones; polyimides; and co-and ter-polymers of (polytetrafluoroethylene) PTFE and polyvinylidene fluoride (PVDF).

The replacement of O—H and C—H bonds with C—F bonds in the polymer fiber waveguide core materials is critically important to over all radiative efficiency of the RE systems. The O—H stretch (~3600 cm$^{-1}$) and C—H stretch (~3200 cm$^{-1}$) vibrations play a dominant role in phonon-assisted, nonradiative removal of electronic excitation energy from excited RE ions. Such nonradiative decay of RE metastable states markedly reduces radiative efficiency and, consequently, severely degrades amplifier device performance. Phonon-assisted decay decreases exponentially with increased number of phonons required to span the energy gap between the metastable state and the ground state. In the new RE perfluoro polymers, the high frequency O—H and C—H bonds are replaced by C—F bonds that possess considerably reduced frequency vibrations (~1000–1200 cm$^{-1}$), and as a consequence, long metastable (~1–10 ms) lifetimes for the RE sites.

Figure 1:
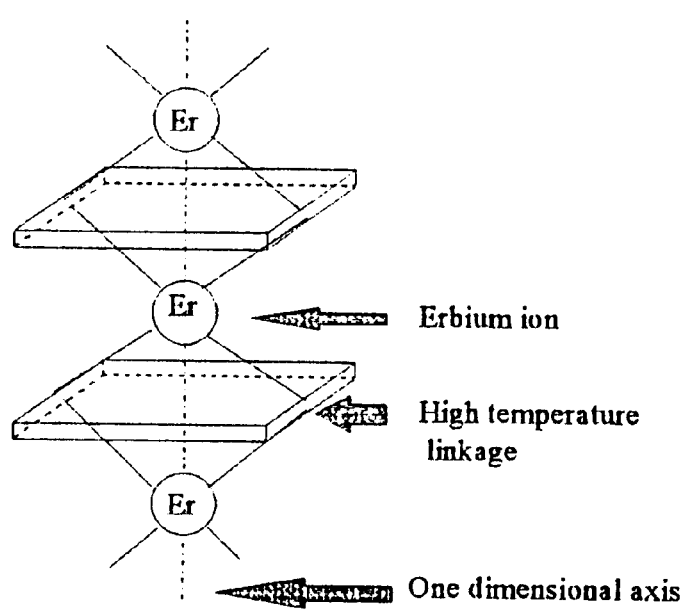
FIG. 1 is a schematic polymer chain structure of erbium fluorophosphinate polymers.

Disclosed is the design and synthesis of two general classes of high optical transparency RE perfluoro polymers for optical amplification applications (FIG. 1). The basic perfluoro phosphate structure avoids the introduction of O—H and C—H bonds and utilizes C—F bonds. The Er$^{3+}$ ion concentration in these novel polymers is relatively high on the order of $10^{21}$ ions/cm$^3$. Also disclosed is the use of commercially available fluoropolymers for cladding materials with the new RE perfluoro polymers. In addition to Er$^{3+}$, both single as well as combinations of RE metal ions can be encapsulated at high concentrations in the basic polymer structure.

The radiative properties of the new materials are measured and characterized. The basic structure of these RE chromophores is composed of an isolated single RE ion encapsulated by a molecular "coordination shell." To create such a shell, perfluorinated organic phosphinate ligands are used with coordinating donor atoms, such as oxygen, to chemically bond to the RE ions which not only isolates the RE ion but also forms a physico-chemical barrier for the RE ion. These RE polymers are highly compatible with high-temperature perfluorinated polymers suitable as passive cladding materials. RE concentrations of ~$10^{20}$–$10^{21}$ ions/cm$^3$~10% wt RE ion have been achieved with no undesirable effects such as clustering and lifetime quenching. These relatively high concentration figures are to be compared to the 0.1% limit common to silica glasses and inorganic crystals.

Importantly, the optical properties of the Er$^{3+}$ perfluoro polymers have been evaluated using Judd-Ofelt analyses in order to obtain important radiative lifetimes and emission cross-sections for transitions to the metastable state. In brief, the results for several cm length polymer waveguides are comparable in performance to that of Er$^{3+}$-doped silica glasses commonly used in 40 m length commercial EDFAs. The results provide further basis for the selected approach of RE perfluoro polymer materials.

Attached are examples based on erbium. The methods described are the same methods used for all the other rare earth ions such as europium, samarium, neodymium, dysprosium, praseodymium, ytterbium, etc.

EXAMPLE 1

Erbium bis-fluorophosphinate Polymer

To a solution of erbium chloride ($ErCl_3 \cdot 6H_2O$) (0.8736 gm; 0.00229 mol) in 11 ml of tetrahydrofuran was added bis-(hexafluorophenoxy) phosphinic acid [$(C_6F_5O)_2POOH$] (1.97 gm; 0.00458 mol). The erbium solution appeared turbid and was heated at reflux for 30 minutes. Potassium carbonate ($K_2CO_3$)(0.475 gm; 0.0034 mol) dissolved in 2.74 ml of water was added dropwise with stirring. The solution was then heated to boiling, and the tetrahydrofuran allowed to evaporate. Additional water was added to maintain the over all volume of the solution. As evaporation neared completion, the solid erbium bis-fluorophophinate polymer ($Er[0_2P(O\ C_6F_5)_2]_2(OH)(H_2O)$) appeared voluminous. The solid residue was filtered and washed several times with water. After air drying at room temperature, the slightly pink white powder was dried in a vacuum oven at 110° C. for 24 hrs. The yield after drying was 1.84 gm. Analysis: Calculated for $ErC_{24}F_{20}H_{30}O_{10}P_2$: C 27.16; F 35.84; P 5.85; H 0.28; and Er 15.78; Found: C 26.90; F 35.39; P 5.63; H 0.20; and Er 15.85.

EXAMPLE 2

Erbium tris-Fluoropphosphinate Polymer

To erbium bis-fluorophosphinate polymer ($Er[0^2P(O\ C_6F_5)_2]_2\ (OH)H_2O$) (0.140 gm; 0.13 mmol) dissolved in 3 ml of o-dichlorobenzene was added bis-(hexaflluorophenoxy) phosphinic acid [$(C_6F_5O)_2POOH$](0.057gm; 0.13 mmol). The solution was heated in an oil bath under nitrogen to 100° C. for approximately 10 minutes. The resulting solution was clear and light pink in color. As soon as the heat was removed, the solution turned viscous. The viscous mixture was placed under nitrogen, and the solvent slowly removed. The resulting slightly pink white solid was collected and placed in a vacuum oven at 40° C. overnight. The yield after drying was 130 mg. Analysis: Calculated for $ErC_{36}F_{30}O_{12}P_3$: C 29.73; F 39.18; P 6.39; H 0.0; and Er 11.5; Found: C 28.52; F 38.94; P 6.61; H 0.16; and Er 11.4.

EXAMPLE 3

Erbium Fluoroalkyl Phosphinate Polymer

To a solution of anhydrous erbium chloride ($ErCl_3$) (0.070 gm, 0.257 mmol) in 0.5 ml of dry acetone was added ($C_7F_{15}$)$_2$pOONa (0.618 gm, 0.77 mmol) in 6 ml of dry acetone. The resulting solution was stirred at room temperature for approximately 72 hours, after which a light pink solid fell out of solution and was filtered by transferring using acetone. The total yield prior to drying was 0.581 gm. 211 mg of the product was stirred with water, filtered, and dried in a vacuum oven at 65° C. with a yield of 190 mg. Analysis: Calculated for $Er[OOP(C_7F_{15})_2]_3$: C 18.91, F 63.63, Er 5.49; Found: C 17.26, F 60.26, Er 5.69.

EXAMPLE 4

Erbium Fluoroalkyl Phosphinate Polymer

To a solution of anhydrous erbium chloride ($ErCl_3$) (0.124 gm, 0.45 mmol) in 0.82 ml of dry acetone was added ($C_8F_{17}$)$_2$POONa (1.256 gm, 1.36 mmol) in 11 ml of dry acetone. The solid formed was stirred for approximately 72 hours, after which the light pink solid was filtered and washed with acetone. The filtered solid was dried in a vacuum oven at 70° C. for two days with a yield of 1.15 gm of dried solid. Calculated for $Er[OOP(C_8F_{17})_2]_3$: C 18.91, F 63.63, Er 5.49; Found: C 17.49, F 62.94, Er 6.51.

EXAMPLE 5

Erbium Fluoroalkyl Phosphinate Polymer

To a solution of anhydrous erbium chloride ($ErCl_3$) (0.060 gm, 0.222 mmol) in 0.4 ml of dry acetone was added ($C_8F_{17}$)$_2$POONa (0.615 gm, 0.665 mmol) in 5 ml of dry acetone. The reaction mixture was stirred for approximately 72 hours. The filtered light pink solid that resulted was washed with acetone and dried in a vacuum oven at 65° C. overnight, yielding 520 mg of dried solid.

EXAMPLE 6

Fluorescence Lifetime

The dried powder of Example 5 was further dried in a vacuum oven at 100° C. and the resulting powder was placed between two glass microscope slides. This sample was then placed in the apparatus shown in FIG. 4, but with the Nd:YAG laser replaced by a 980 nm laser, the monochromator replaced by a long pass filter, and the photomultiplier tube (PMT) replaced by a photodiode. The long pass filter is designed to block the scattered light at 980 nm but to allow the fluorescing light at 1500–1600 nm to be captured by the photodiode. The filter was established to be operating properly so that no 980 nm light contributed to the signal. The 980 nm laser was modulated at a 50 Hz repetition rate with a square wave modulation profile. This 980 light stimulated fluorescence of the $Er^{3+}$ fluorophosphinate polymer, and the lifetime of the fluorescence was observed with the oscilloscope. The resulting data was fit to a single exponential decay and the lifetime was determined to be 2.57 msec.

EXAMPLE 7

Thin Film Preparation

The dried powder of Example 5 was dissolved at 10 wt % in N,N-dimethylacetamide at room temperature. The resulting solution was then cast onto microscope slides and dried in an oven at 115° C. to result in a thin film of the $Er^{3+}$ fluorophosphinate polymer. This film was inspected using light and dark field microscopy and was confirmed to consist of an amorphous thin film material, suitable for optical waveguiding.

EXAMPLE 8

Disclosed is an amplifier system using RE polymer materials. The principal wavelength of interest in communications systems is 1550 nm. Here, an $Er^{3+}$ perfluoro polymer waveguide pumped by 980 nm light and operating at 1550 nm is disclosed and analyzed.

The important quantity characterizing an amplifier is its single pass gain. The 1550 nm Er transition operates as a three-level laser transition (FIG. 2). Level 2 is an absorption band of the chromophore ligand as discussed above and, therefore, allows for enhanced absorption. Experimentally it is often found that the lifetime of level 2 is much shorter than the metastable state (level 3), and, hence, the steady state population of level 2 is negligible. Therefore, the total number density of ions is given by $N=N_1+N_3$, where $N_i$ denotes the population of state i. The steady state rate equations can then be solved to yield $$\frac{N_1}{N} = \frac{W_{31} + \frac{1}{\tau_3}}{W_{31} + \frac{1}{\tau_3} + W_{12}}, \frac{N_3}{N} = \frac{W_{12}}{W_{31} + \frac{1}{\tau_3} + W_{12}} \quad (1)$$

where $W_{12}$ and $W_{31}$ are the stimulated absorption and stimulated emission rates, respectively, and $\tau_3$ is the metastable state lifetime. The stimulated transition rates are given by $$W_{12} = \frac{\sigma_p I_p}{h\nu_p}; \quad W_{31} = \frac{\sigma_e I_s}{h\nu_s} \quad (2)$$

where $\sigma_p$ is the absorption cross-section at the pump wavelength, $h\cup_p$ is the pump photon energy, and $I_p$ is the pump photon intensity. Similarly, $\sigma_e$ is the emission cross-section, $h\cup_s$ is the signal photon energy, and $I_s$ is the signal photon intensity. Given the steady state populations, (Eq. 1), the evolution of the pump and signal beam intensities along the length of the waveguide (z-direction) can be derived. Neglecting excited state absorption, the intensity equations are given by $$\int_0^\infty \int_0^{2\pi} \frac{dI_p}{dz} r\, dr\, d\phi = -\int_0^\infty \int_0^{2\pi} (n(r, \phi, z)\sigma_p N_1 + \alpha_p) I_p r\, dr\, d\phi \quad (3)$$

$$\int_0^\infty \int_0^{2\pi} \frac{dI_s}{dz} r\, dr\, d\phi = +\int_0^\infty \int_0^{2\pi} (n(r, \phi, z)\sigma_e N_3 - \alpha_s) I_s r\, dr\, d\phi$$

where $n(r,\phi,z)$ is the RE ion distribution and $\alpha_p$ and $\alpha_s$ are the absorption coefficients of the undoped polymer waveguide at the pump and signal wavelengths, respectively. These first order differential equations are coupled through the steady state population densities and can be solved by integrating the signal and pump wavefunctions over the waveguide cross-section and implementing a fourth order Runge Kutta technique.

Results for a $Er^{3+}$ perfluoro polymer waveguide amplifier 6 μm in diameter show that the amplifier gain versus waveguide width for a waveguide of length 3 cm has a maximum gain of approximately 30 dB. The dependence of single pass gain on length for a 4 μm wide waveguide suggest the optimal length for a maximum gain of 34 dB is about 5 cm, three orders of magnitude shorter than typical silica glass EDFA. This characteristic feature is a direct consequence of the high RE concentrations ($\sim 10^{20}$–$10^{21}$ ions/cm$^3$~10% wt) compared with silica glass EDFAs (<0.1% wt). Thus, one outstanding advantage of our RE perfluoro polymer systems is that they are conducive to very short length optical waveguide devices on the order of only a few cm and less.

As described above, a variety of commercially available fluoropolymers can be used as cladding materials with our new RE perfluoro phosphate polymers. Recently, there has been developed new low melting temperature fluoro phosphate glasses and their fabrication process. These glasses are transparent from the near ultraviolet to the near infrared. They are dense, chemically durable, relatively hard, and can be readily fabricated into various shapes and sizes. Organic chromophores and polymer powders are readily incorporated into these glasses at 280° C., making them suitable hosts for many fluorescent organic materials. High optical quality organic chromophore doped fluoro phosphate glass hybrid materials have been obtained. $Er^{3+}$ fluorophosphinate polymers at high concentrations can be doped into this low melting temperature fluoro phosphinate glass to form the fiber waveguide core material. The lower refractive index undoped fluoro phosphinate glass can serve as the fiber cladding material. It is indicated that this material can be pulled into a fiber without dentrifying.

Figure 4:
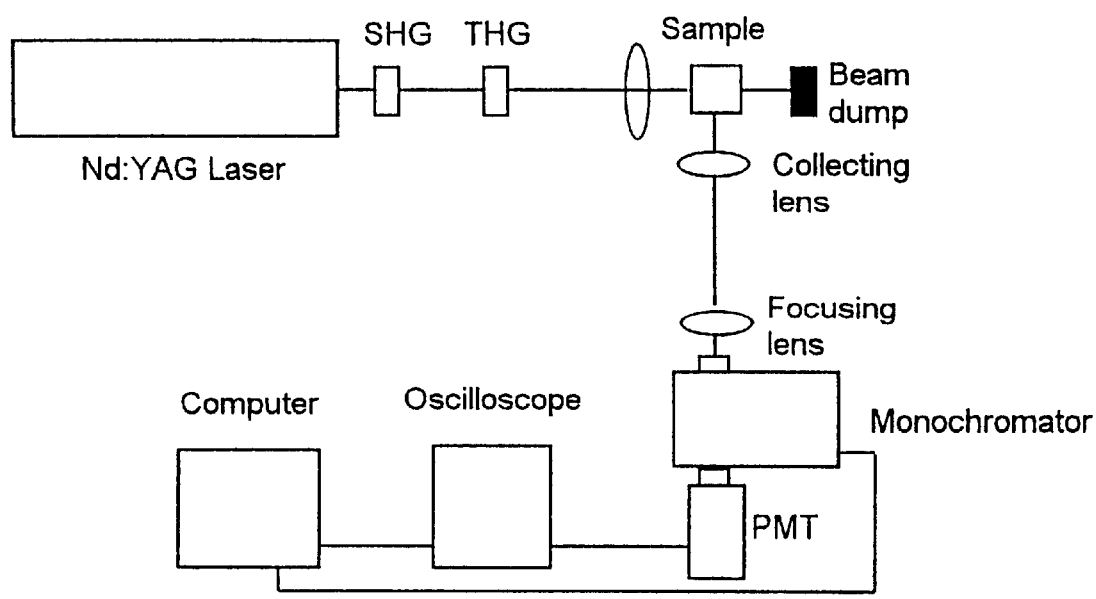
FIG. 4 is a setup for picosecond fluorescence and radiative lifetime measurements.

The optical properties of the RE polymers are measured using the setup of FIG. 4. The setup can be used to measure both the metastable state lifetime of the lasing transition and the emission spectrum. This experiment uses a laser pump source together with a computer-assisted detection system that includes a PMT, digital oscilloscope, and a monochromator. The RE polymer sample is pumped by a picosecond Nd:YAG laser using the energy transfer antenna effect. Since the pump pulse is much shorter than the lifetimes of the excited metastable states, these lifetimes can be simply measured by monitoring the dynamic decay of the fluorescence signal. The fluorescence signal is detected perpendicular to the incident pump beam direction in order to minimize pump scattering. The light is focused onto a monochromator, which selects the wavelength, and is detected by a PMT. The signal is recorded by a digital oscilloscope and the data is transferred to a computer for analysis. A complete fluorescence spectrum is obtained by sweeping the monochromator through a wavelength range and recording the corresponding intensities.

Figure 5:
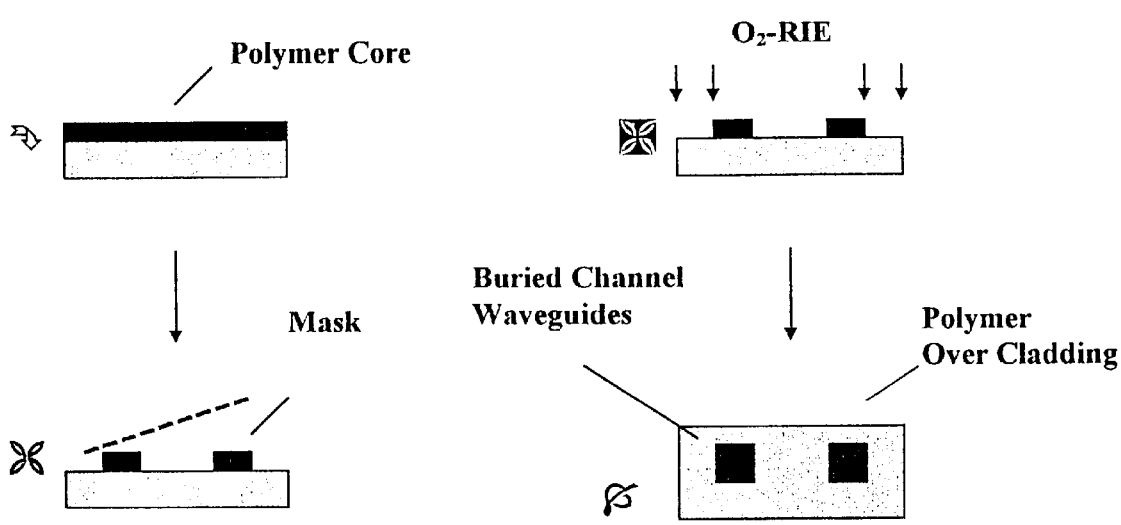
FIG. 5 is a depiction of the fabrication of polymer channel waveguides utilizing standard silicon VLSI processing steps.

The $Er^{3+}$ perfluoro polymer optical fiber amplifier/splitter can be fabricated using standard melt fiber draw methods together with silicon VLSI techniques well established for integrated passive polymer optical waveguide devices (FIG. 5). The RE polymer optical fiber amplifier can be aligned in a V-groove and connected by fiber pig tails to a polymer optical circuit consisting of a 2-channel waveguide fiber coupler for the 1550 nm signal and 980 nm pump and an N-channel splitter formed by standard optical lithography. Each polymer waveguide to be coupled to the fiber amplifier is formed by reactive ion etching and then over coated with suitable polymer over cladding.

Filtering of the optical pump light is accomplished by introducing a suitable Bragg reflector at the output end face for the waveguide. Prior to spin-coating, the silicon substrate is etched with periodic rulings which produce the desired Bragg reflector upon RE polymer material deposition. Coupling of light into and out of the waveguide can be accomplished by using another Bragg grating as an input coupler. In addition, simple end fire coupling, filtering, and detection are easy alternative options.

What is claimed is:

1. An optical material made from at least one polymer of a general composition $\{X[OOPRR']_3\}_n$ where
   X is a rare earth element;
   R is a fully halogenated organic group; and
   R' is a second fully halogenated organic group.
2. The material of claim 1, wherein X is selected from the group consisting of erbium, europium, samarium, dysprosium, neodymium, praseodymium, thulium and ytterbium.
3. The material of claim 1, wherein R and R' are fluoroalkyl chains of a general composition $C_m F_{2m+1}$ where $m \geq 1$ and $R \neq R'$.
4. The material of claim 1, wherein R and R' are fluoroalkyl chains of a general composition $C_m F_{2m+1}$ where $m \geq 1$ and $R = R'$.
5. The material of claim 1, wherein $R = R'$ and is a hexafluorophenoxy group of a composition $C_6 F_5 O$.
6. The material as claimed in claim 1, further comprising fluoropolymers combined with the at least one polymer.
7. The material as claimed in claim 6, wherein the fluoropolymer is a fluorinated polyimide, polytetrafluorethylene, or a derivative of polytetrafluoroethylene, fluorinated acrylate or fluorinated silicone.

8. The material of claim 1, further comprising at least one halogentated polymer combined with the at least one polymer.

9. The material of claim 1, further comprising at least one fluorophosphate glass combined with the at least one polymer.

10. An optical amplifying fiber comprising a fiber core composed of the material of claim 1, and a fiber cladding comprised of a lower refractive index material, such that a core-cladding refractive index difference is small enough to result in a single optical mode propagation for optical wavelengths ranging from 1200–1700 nm.

11. An optical amplifying film comprising: a substrate, a buffer film, and a guiding layer film, the guiding layer film composed of the material as claimed in claim 1, and an upper cladding layer film, such that refractive indices of the buffer film and the upper cladding film are less than that of the guiding layer film, with a resulting waveguide guiding a single optical mode for optical wavelengths ranging from 1200–1700 nm.

* * * * *

UNITED STATES PATENT AND TRADEMARK OFFICE
CERTIFICATE OF CORRECTION

PATENT NO. : 6,292,292 B1
DATED : September 18, 2001
INVENTOR(S) : Garito et al.

It is certified that error appears in the above-identified patent and that said Letters Patent is hereby corrected as shown below:

<u>Title page,</u>
Item [73], Assignee: "Photon-X," should read -- Photon-X, Inc. --.

<u>Column 11,</u>
Line 1, "polytetrafluorethylene" should read -- polytetrafluoroethylene --.
Line 5, "halogentated" should read -- halogenated --.

<u>Column 12,</u>
Line 12, please insert claim 12 as follows:

-- 12. An optical material of claim 1 fabricated using a melt fiber drawing method together with silicon VLSI techniques. --

Signed and Sealed this

Twenty-ninth Day of October, 2002

Attest:

JAMES E. ROGAN
Attesting Officer          Director of the United States Patent and Trademark Office